May 7, 1957  R. R. MEFFORD  2,791,367
COLLAPSIBLE CONTAINER
Filed May 9, 1955
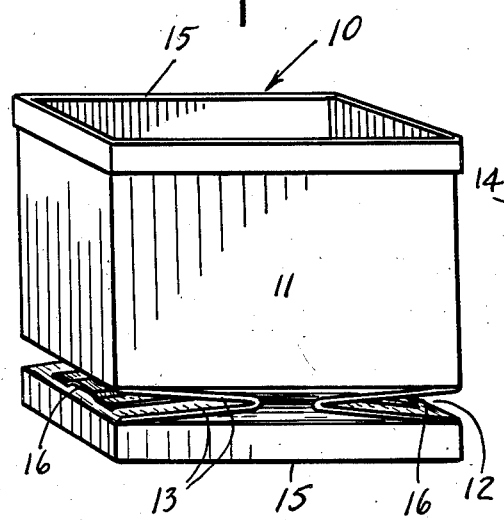
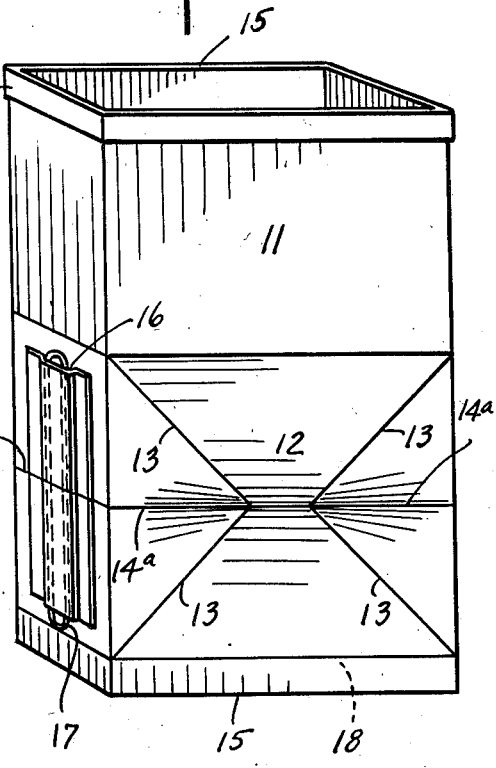
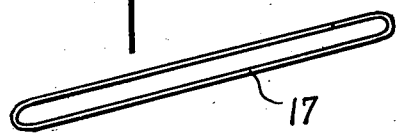
INVENTOR.
ROBERT R. MEFFORD.
BY
Lockwood, Galt, Woodard + Smith
ATTORNEYS.

United States Patent Office 2,791,367
Patented May 7, 1957

2,791,367

COLLAPSIBLE CONTAINER

Robert R. Mefford, Lebanon, Ind.

Application May 9, 1955, Serial No. 506,916

1 Claim. (Cl. 229—41)

This invention relates to an extensible container, and more particularly to one that may readily be converted from a collapsed compact form wherein it serves as a receptacle for powdered food products to an extended form wherein it serves as a container for the liquid product resulting from the mixing of water.

The primary object of the invention is to provide a container that is characterized by a relatively small form when a food concentrate is packaged therewithin and yet which is extensible into a relatively large form when the volume of the concentrate has been appreciably expanded as a result of the mixing therewith of water. As is well known, more and more food products are being powdered, shipped, stored and vended in that form, and then ultimately prepared by the purchaser for consumption by the addition of a specified amount of water. For example, in addition to powdered milk there are today on the market concentrates such as frozen citrus, dehydrated oranges and many other products. With the present invention the container in which the concentrate is packaged serves the dual purpose of a container for the concentrate as well as a container for the liquid product developed therefrom through the addition of water.

It is a further object of the present invention to provide a container of the character described that is easy to fabricate, inexpensive in price and marked by a simplicity of operation.

It is a still further object of the present invention to provide simple means for retaining and holding the carton in its extended position.

The full nature of the invention will be understood from the accompanying drawings and the following description and claim:

In the drawings Fig. 1 is a perspective view of the container in collapsed or retracted form.

Fig. 2 is a perspective view thereof in extended form.

Fig. 3 is a perspective view of the means devised to retain the container in its extended position.

In the drawings the container is shown generally at 10, it preferably being formed of a waxed cardboard type material that today is common to milk cartons. The container has the upper portion 11 and the lower or collapsible portion 12.

The lower or collapsible portion has formed therein the fold lines 13 and the score or fold lines 14 and 14a, lines 14 and 14a extending about the perimeter of the container in a plane substantially parallel to the bottom and top 15. By pushing inwardly on the fold lines 14 the container may be collapsed to the position shown in Fig. 1. As may be observed from that figure, but one pleat or accordion type leaf is utilized although it is to be understood that a plurality of such pleats or leaves may be employed without departing from the spirit of the invention.

Formed in at least one face or side of the carton is the pocket 16 for reception of the clip or reinforcing element 17. The pocket will be of such length as to extend an appreciable distance, relatively, on either side of the score line 14, and will be sized to slidingly receive the reinforcing element in friction fit relation.

The bottom of the container is preferably inset as shown at 18 to provide a re-entrant portion for reception of the clip during shipment of the container in its collapsed form. That is to say, the clip may be adhered in some suitable way to the re-entrant portion of the container where it will be available for use when desired, and yet safe from loss prior to use.

The upper extremity of the container is provided with a beaded portion 19 for reinforcing purposes and for accommodation of the cap or closure (not shown) which will be placed thereover. In addition, the bead provides a finger-grip portion to facilitate the extension of the container from collapsed position.

In operation the powdered product will be placed in the bottom of the container which will at that time be in its collapsed form. The closure will be placed on the container and it may be shipped and stored in that condition. At such time as the housewife desires to convert the product into liquid, it is necessary only that she pull upwardly by grasping the beaded portion 19 whereupon the container will achieve its extended form as shown in Fig. 2. At such time the housewife may remove the clip from its original point of location and extend it through the pocket. Thereupon water may be mixed in and the liquid food product thereby formed. Because of the arrangement of the clip within the pocket the housewife may be confident that the carton will remain in its extended position even when the closure is removed therefrom as during pouring. As is apparent, one or more additional clip and pocket constructions may be formed when desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A container for powdered food products to which water is added prior to consumption, comprising a four sided body having a normally collapsed portion, said portion including at least one fold line in each side being extensible to provide greater container area, a pocket formed in the wall of at least one side of said normally collapsed portion and bridging said fold line, and rigid locking means mounted in said pocket when said container is moved to extended position for locking said container in said extended position said means also bridging said fold line.

References Cited in the file of this patent
UNITED STATES PATENTS

| 726,941 | Kertz | May 5, 1903 |
| 783,089 | Wildmann | Feb. 21, 1905 |
| 1,671,020 | Feinberg | May 22, 1928 |
| 1,767,274 | Broderick | June 24, 1930 |

FOREIGN PATENTS

| 2,026/26 | Australia | Apr. 13, 1927 |